United States Patent
Yan et al.

(10) Patent No.: US 10,873,260 B2
(45) Date of Patent: Dec. 22, 2020

(54) ZERO-VOLTAGE SWITCHING HYBRID SWITCHED-CAPACITOR CONVERTER

(71) Applicant: Analog Devices International Unlimited Company, Limerick (IE)

(72) Inventors: Yingyi Yan, Milpitas, CA (US); Yi Ding Gu, Milpitas, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/273,659

(22) Filed: Feb. 12, 2019

(65) Prior Publication Data

US 2019/0280618 A1   Sep. 12, 2019

Related U.S. Application Data (60) Provisional application No. 62/641,834, filed on Mar. 12, 2018.

(51) Int. Cl.
| | |
|---|---|
| *H02M 3/158* | (2006.01) |
| *H02M 1/00* | (2006.01) |
| *H02M 3/07* | (2006.01) |

(52) U.S. Cl.
CPC .............. *H02M 3/158* (2013.01); *H02M 3/07* (2013.01); *H02M 2001/0058* (2013.01)

(58) Field of Classification Search
CPC ............. H02M 7/53873; H02M 1/083; H02M 2001/0058
See application file for complete search history.

(56) References Cited

U.S. PATENT DOCUMENTS

| | | | |
|---|---|---|---|
| 6,349,044 B1 | 2/2002 | Canales-Abarca et al. | |
| 6,788,033 B2 | 9/2004 | Vinciarelli | |
| 2004/0245972 A1* | 12/2004 | Vire .................. | H02M 3/07 323/282 |

(Continued)

FOREIGN PATENT DOCUMENTS

| | | |
|---|---|---|
| CN | 1286521 A | 3/2001 |
| CN | 1988346 A | 6/2007 |

(Continued)

OTHER PUBLICATIONS

Canales, Francisco, et al., "A Zero Voltage Switching Three-Level DC/DC Converter", 22nd Intl.Telecommunications Energy Conference (INTELEC), (Sep. 2000), 6 pgs.

(Continued)

*Primary Examiner* — Fred E Finch, III
*Assistant Examiner* — Rafael O De Leon Domenech
(74) *Attorney, Agent, or Firm* — Schwegman Lundberg & Woessner, P.A.

(57) ABSTRACT

A voltage converter circuit comprises a charge pump circuit, a switching converter circuit, and a control circuit. The charge pump circuit includes multiple switch circuits connected in series. The switching converter circuit includes a first inductor coupled to an output node of the voltage converter circuit, and a second inductor coupled to a series connection of the multiple switch circuits. The control circuit is configured to control activation of the multiple switch circuits to generate a regulated voltage at the output node, and to activate each of the multiple switch circuits when a drain to source voltage of the switch circuit is zero volts.

15 Claims, 8 Drawing Sheets

(56) References Cited

U.S. PATENT DOCUMENTS

| | | | |
|---|---|---|---|
| 2006/0170043 A1 | 8/2006 | Liu et al. | |
| 2009/0033293 A1* | 2/2009 | Xing | H02J 7/025 320/164 |
| 2011/0018511 A1* | 1/2011 | Carpenter | H02M 3/158 323/282 |
| 2017/0170722 A1* | 6/2017 | Jung | H03K 3/0315 |
| 2019/0190368 A1* | 6/2019 | Rainer | H02M 1/083 |

FOREIGN PATENT DOCUMENTS

| | | |
|---|---|---|
| CN | 101075784 A | 11/2007 |
| CN | 107612326 A | 1/2018 |
| CN | 110266184 A | 9/2019 |
| JP | 2005184965 A | 7/2005 |
| JP | 5569085 B2 | 7/2014 |

OTHER PUBLICATIONS

Mei, Ye, et al., "Non-isolated stacked bidirectional soft-switching DC-DC converter with PWM plus phase-shift control scheme", Mod Power Syst. Clean Energy, 5(4), (2017), 11 pgs.

Zhu, Tianyu, et al., "A Novel High Efficiency Quasi-Resonant Converter", Energies, 11, (Jul. 2018), 14 pgs.

\* cited by examiner

ZERO-VOLTAGE SWITCHING HYBRID SWITCHED-CAPACITOR CONVERTER

CLAIM OF PRIORITY

This application claims the benefit of priority to U.S. Provisional Application No. 62/641,834, filed on Mar. 12, 2018, which is hereby incorporated by reference in its entirety.

FIELD OF THE DISCLOSURE

This document relates to integrated circuits and in particular to power converter circuits that provide a regulated voltage from an input voltage.

BACKGROUND

Electronic systems can include devices that require a regulated power source. Switching power converter circuits can be used to provide a regulated voltage to a load. However, the power level of electric loads continues to increase. As the required power level increases, switching loss can significantly reduce efficiency of the power converter circuits.

SUMMARY OF THE DISCLOSURE

This document relates generally to power converter circuits and methods of their operation. In some aspects, a voltage converter circuit includes a charge pump circuit, a switching converter circuit, and a control circuit. The charge pump circuit includes multiple switch circuits connected in series. The switching converter circuit includes a first inductor coupled to an output node of the voltage converter circuit, and a second inductor coupled to a series connection of the multiple switch circuits. The control circuit is configured to control activation of the multiple switch circuits to generate a regulated voltage at the output node, and to activate each of the multiple switch circuits when a drain-to-source voltage of the switch circuit is zero volts.

In some aspects, a method of operating a voltage converter circuit includes charging a first inductor of a switching converter circuit of the voltage converter circuit and a second inductor of the voltage converter circuit using energy provided by a charge pump circuit of the voltage converter circuit, the charge pump circuit including multiple switch circuits connected in series; and activating the multiple switch circuits in a specified sequence to generate a regulated voltage at an output node of the voltage converter circuit, wherein each of the multiple switch circuits is activated when a drain-to-source voltage of the switch circuit is zero volts.

In some aspects, a supply circuit includes a charge pump circuit, a step-down switching converter circuit, and a control circuit. The charge pump circuit includes multiple switch circuits connected in series. The step-down switching converter circuit includes a first inductor coupled to an output node of the supply circuit, and a second inductor coupled to a series connection of the multiple switch circuits. The control circuit controls activation of the multiple switch circuits according to a duty cycle to generate a regulated voltage at the output node, and activates each of the multiple switch circuits when a drain-to-source voltage of the switch circuit is zero volts.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Power converter circuits may be used to provide a regulated voltage that is a circuit supply for an electronic system. Some power converter circuits are switching power converter circuits that convert the input voltage to the regulated output voltage. As the power level of electric loads continues to increase, system designers of electronic systems tend to step down the operating or supply voltage from a higher voltage bus. For a step-down or buck power converter, the regulated voltage conversion can provide a regulated output voltage that is lower than the input voltage of the power converter circuit. However, converting a high bus voltage down to a lower output voltage can result in a high switching loss. To maintain a reasonable conversion efficiency, the converters typically operate at low switching frequency. However, converters that operate at low frequency typically have a bulky magnetic component (e.g., a large inductor) and a slow transient response.

Figure 1A:
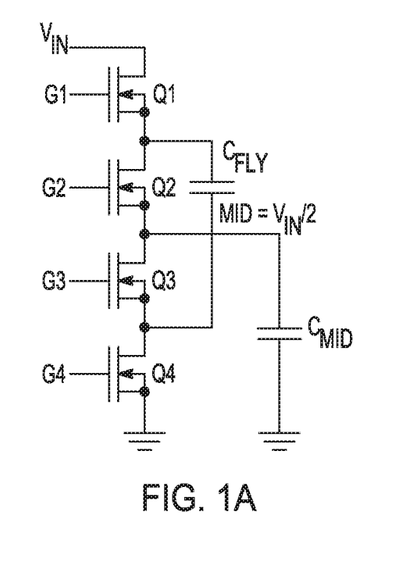
FIG. 1A is an example of portions of a divide-by-two charge pump circuit in an aspect.
Figure 1B:
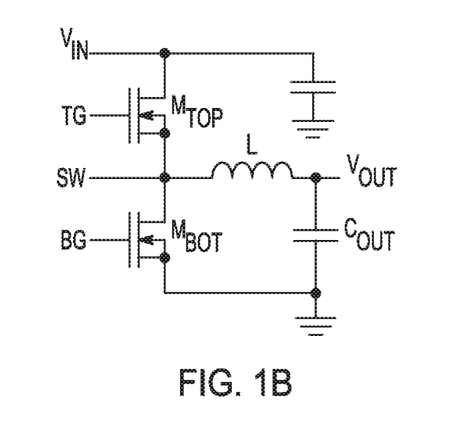
FIG. 1B is an example of portions of a step down converter circuit in an aspect.

FIG. 1A is an example of portions of a divide-by-two charge pump circuit. In operation, the switches Q1-Q4 are activated in pairs using gate connections G1-G4. The switches are n-type field effect transistors (NFETs). Activating switches Q1 and Q3 together and deactivating switches Q2 and Q4 charges the flying capacitor ($C_{FLY}$) and the midpoint capacitor ($C_{MID}$) in series from $V_{IN}$. The voltage at the output of the circuit is reduced from the voltage at the input by a factor of two, or $V_{OUT}=V_{IN}/2$. Activating switches Q2 and Q4 together and deactivating switches Q1 and Q3 arranges $C_{FLY}$ and $C_{MID}$ in parallel and drives the output. FIG. 1B is an example of portions of a step down converter circuit that includes a magnet component—inductor L.

Figure 2:
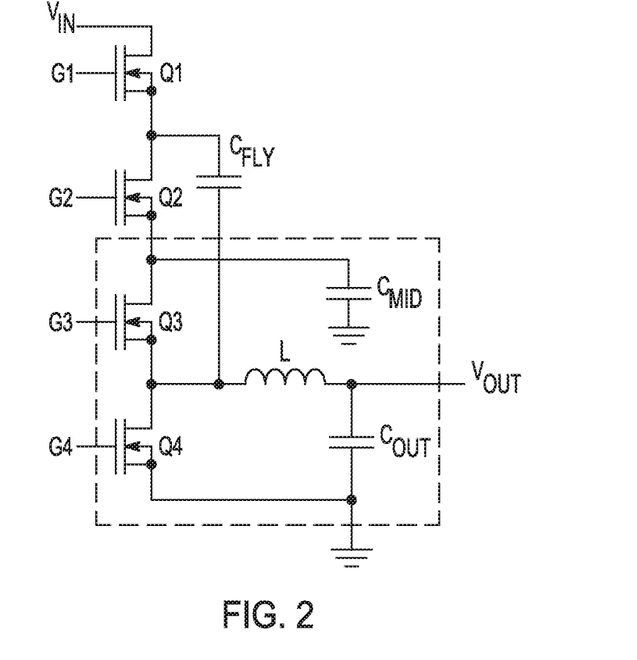
FIG. 2 is an example of portions of a hybrid-switched capacitor converter circuit in an aspect.

FIG. 2 is an example of portions of a hybrid-switched capacitor converter circuit for high voltage input step down conversion. The hybrid converter is a combination of the charge pump of FIG. 1A and the step down converter of FIG. 1B. Switches Q3 and Q4, the inductor, and the capacitors inside the dotted lines of FIG. 2 comprise the step down converter. The step down converter is powered off of $V_{IN}/2$ instead $V_{IN}$. The switching loss in a step down converter is a function of the square of the supply. By reducing the supply voltage, the switching loss is significantly reduced. The divided down voltage also allows reducing the size of the inductor and allows the switching frequency of the converter to be increased.

The efficiency of the hybrid converter circuit can be further improved if zero-voltage switching (ZVS) action of the switches is used in the circuit operation. In ZVS, an FET is not activated until its drain-to-source voltage ($V_{DS}$) is close to zero volts. ZVS is sometimes referred to as soft switching, and the typical operation of a switching converter involves hard switching.

Figure 3A:
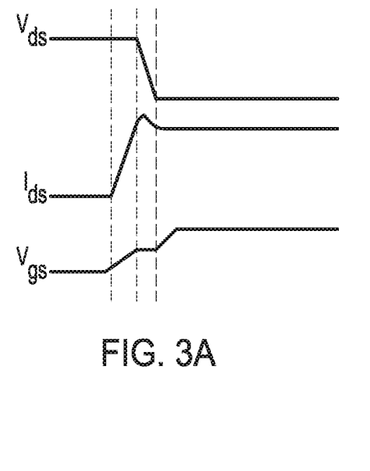
FIG. 3A is an illustration of waveforms associated with hard switching of a field effect transistor.
Figure 3B:
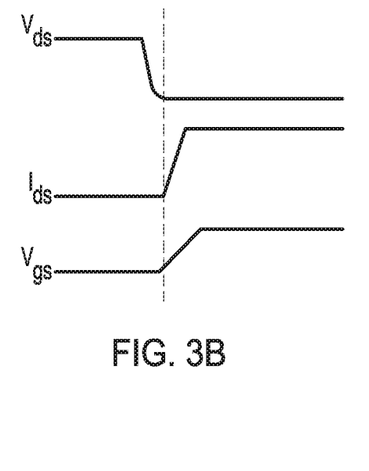
FIG. 3B is an illustration of waveforms associated with zero-voltage switching of a field effect transistor in an aspect.

FIG. 3A is an illustration of waveforms associated with hard switching of an FET. The waveforms show that the gate-to-source voltage ($V_{GS}$) is applied while $V_{DS}$ of the FET is high. The waveforms also show that after $V_{GS}$ is applied to the FET to activate the gate, the drain-to-source current ($I_{DS}$) first ramps up to its direct current (DC) value and then $V_{DS}$ of the FET starts to drop. The overlapping $I_{DS}$ and $V_{DS}$ of the FETs contribute to switching loss of a converter circuit including the hybrid converter circuit. FIG. 3B is an illustration of waveforms associated with ZVS of an FET. The waveforms show that $V_{GS}$ is not applied to activate the FET until the $V_{DS}$ of the FET is close to zero. This minimizes the overlap of $V_{DS}$ and $I_{DS}$ of the FET.

Normally to reduce conduction loss, the on resistance of the FETs ($R_{DSON}$) is chosen to be as small as possible, but this comes at the expense of increased switching loss. With ZVS switching, this tradeoff between conduction loss and switching loss can be eliminated. Also, because switching loss is a function of frequency, minimizing switching loss through ZVS allows the converter to switch at a higher frequency while maintaining good efficiency; further reducing the size need for the magnetic component.

In the hybrid converter circuit of FIG. 2, the circuit can be designed so that FETs Q1 and Q3 turn ON at the same time. However, $V_{DS}$ of Q1 and Q3 will be close to $V_{IN}/2$ when they are turned on and they will be hard switched during operation of the circuit.

Figure 4:
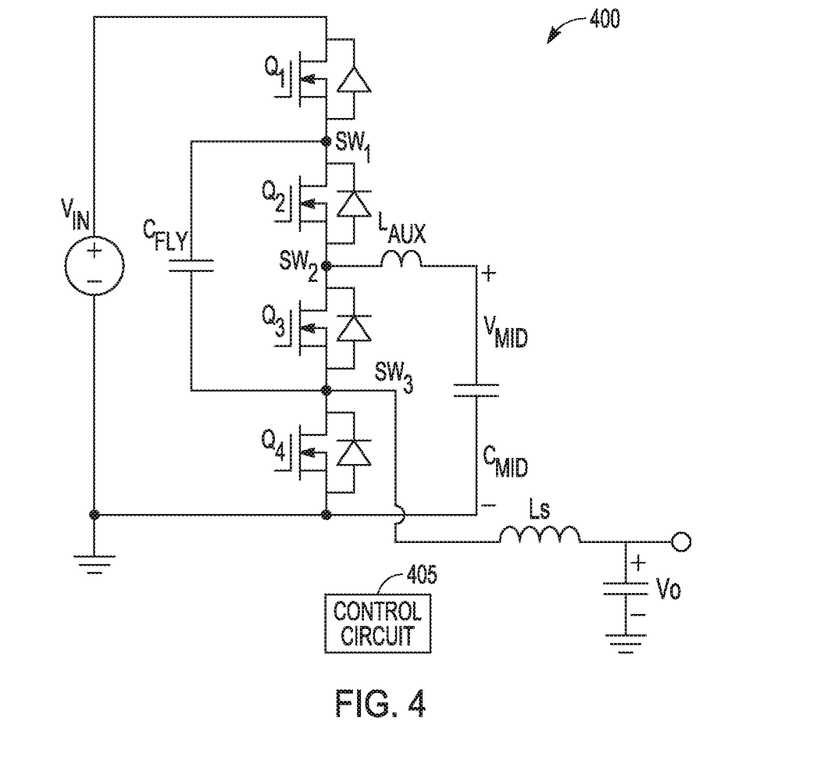
FIG. 4 is a circuit diagram of an example a zero-voltage switching hybrid switched capacitor voltage converter circuit in an aspect.

FIG. 4 is a circuit diagram of an example a zero-voltage switching hybrid switched capacitor voltage converter circuit. The hybrid converter circuit 400 includes a charge pump circuit and a switching converter circuit. The charge pump circuit may have a divide-by-two circuit topology. The charge pump circuit includes four switch circuits ($Q_1$-$Q_4$) connected in series between $V_{IN}$ and circuit ground, and includes capacitors $C_{FLY}$ and $C_{MID}$. In the example of FIG. 4, the switch circuits are NFETs. The body diodes of the NFETs are also shown in FIG. 4. The switching converter circuit includes switch circuits $Q_3$ and $Q_4$, output capacitor $C_O$, inductor $L_S$, and auxiliary inductor $L_{AUX}$. Inductor $L_S$ is coupled to the output node of the voltage converter circuit. Inductor $L_{AUX}$ is coupled to circuit node $SW_2$ which is the series connection between switch $Q_2$ and $Q_3$ and to $C_{MID}$. The hybrid converter circuit 400 also includes a control circuit 405 that controls activation of the multiple switch circuits. In certain aspects, the control unit may include one or both of a programmable delay circuit and a zero-voltage comparator circuit across the drain and source of the FETs to control the timing of the turning ON of switches $Q_1$-$Q_4$.

Figure 5:
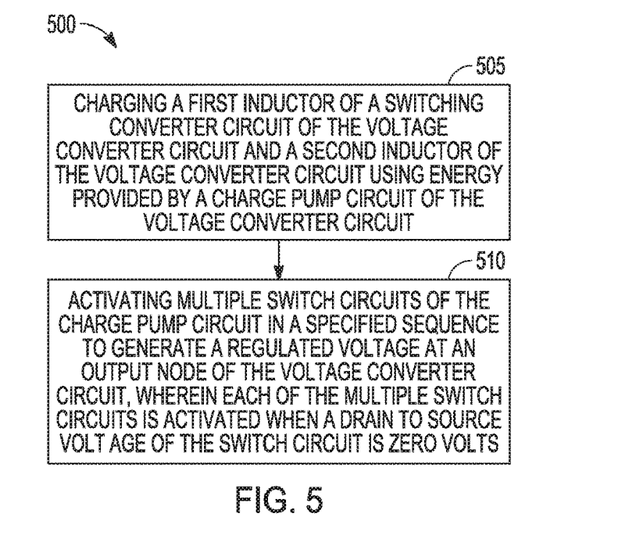
FIG. 5 is a flow diagram of a method of operating a voltage converter circuit in an aspect.

FIG. 5 is a flow diagram of a method of operating the voltage converter circuit example of FIG. 4. At 505, inductor $L_S$ and inductor $L_{AUX}$ of the switching converter circuit are charged using energy provided by the charge pump circuit. At 510, the switch circuits $Q_1$-$Q_4$ are activated by the control circuit 405 to generate a regulated voltage at the output node. Each of the switch circuits $Q_1$-$Q_4$ are activated when the drain to source voltage of the switch circuit is zero volts, i.e., each of the switches is activated using ZVS.

Figure 6:
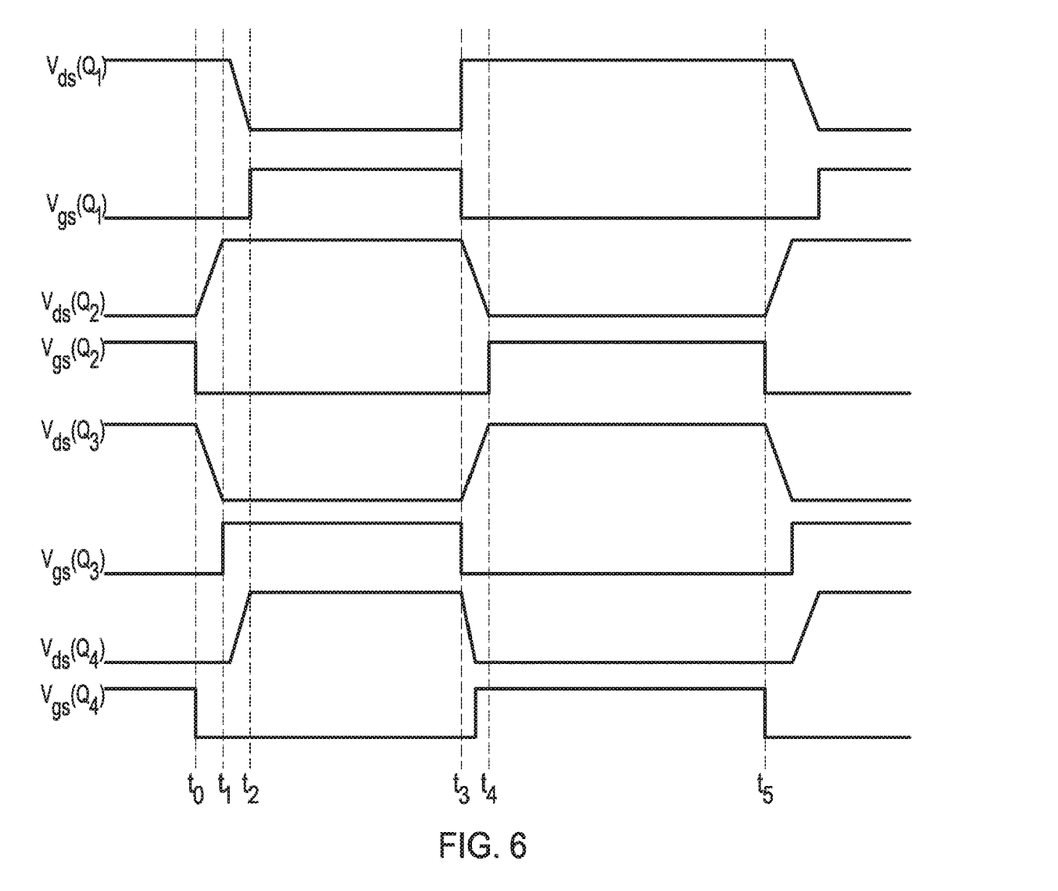
FIG. 6 is a timing diagram of example waveforms used to activate switch circuits with zero-voltage switching in an aspect.

FIG. 6 is a timing diagram of example waveforms used to activate the switch circuits $Q_1$-$Q_4$ with ZVS. The waveforms may be implemented using circuitry included in the control unit 450. The control circuit controls $Q_1$ and $Q_3$ to be active or "ON" together as a pair and controls $Q_2$ and $Q_4$ to be ON together as a pair, although there is a difference in the rising edge of the turn ON time between switches of a switch pair. The $Q_2$, $Q_4$ switch pair are complimentary switches to the $Q_1$, $Q_3$ switch pair, and the ON time of $Q_1$, $Q_3$ is non-overlapping with the ON time of $Q_2$, $Q_4$. The duty ratio between the $Q_1$, $Q_3$ on-time and the period of the switching cycle determines the output voltage $V_O$. The control circuit 405 may use feedback of the output voltage to vary the duty cycle to generate a regulated output voltage.

Figure 7A:
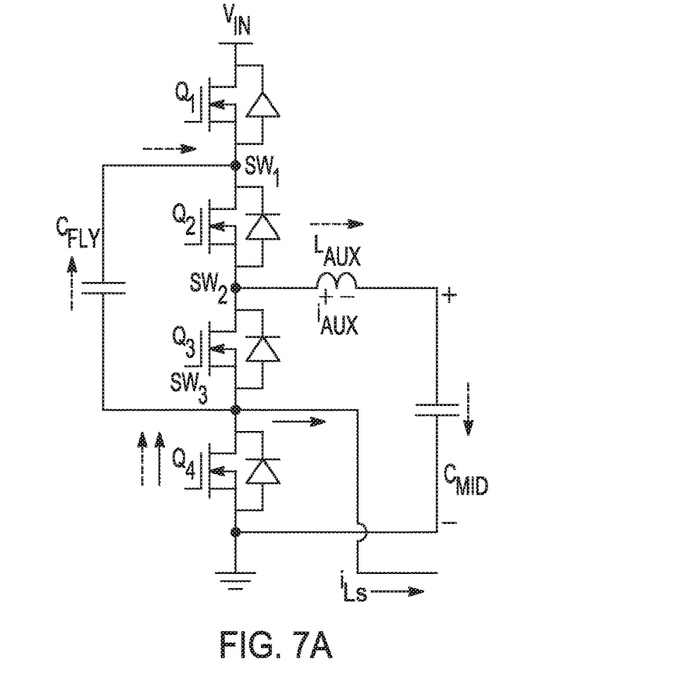
FIGS. 7A-7E show the operation of the voltage converter circuit when activated with the signal waveforms of FIG. 6 in aspect.

FIGS. 7A-7E show the operation of the voltage converter circuit when activated with the signal waveforms of FIG. 6. FIG. 7A shows the operation prior to time to in FIG. 6. As shown in FIG. 6, prior to time to, $Q_2$ and $Q_4$ are ON as indicated by $V_{GS}(Q_2)$ and $V_{GS}(Q_4)$ being high. Flying capacitor $C_{FLY}$ is connected in parallel to midpoint capacitor $C_{MID}$ via switches $Q_2$ and $Q_4$. There is a charge redistribution between these two capacitors, resulting in current flowing through $L_{AUX}$ in the direction indicated by the arrows with the dashed lines. With the current flowing through inductor $L_{AUX}$, energy is being stored. The current flowing to inductor $L_S$ is shown by the arrows with the solid lines. During this time, the voltage across the parasitic capacitance across the drain and source ($C_{DS}$) of $Q_3$ is such that the drain voltage of $Q_3$ is higher than the source voltage of $Q_3$ by about $V_{IN}/2$.

Figure 7B:
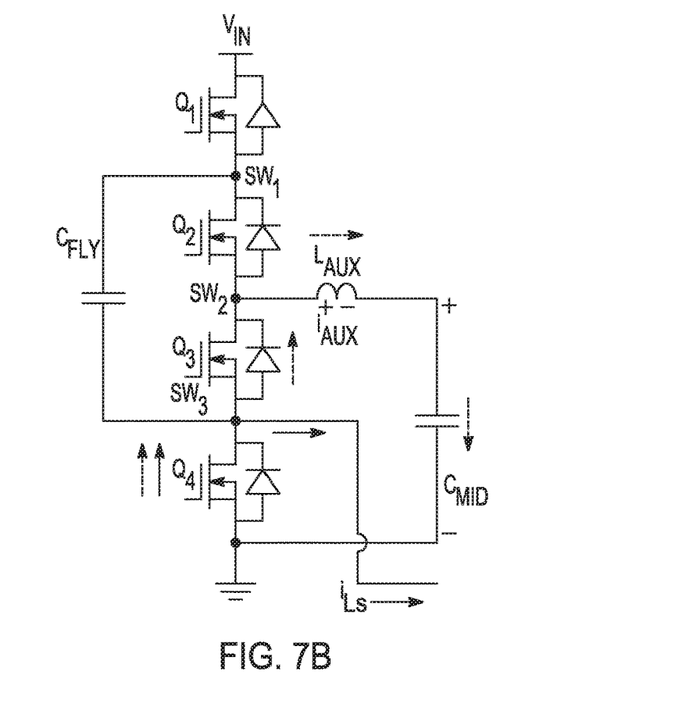

FIG. 7B shows the operation of the voltage converter circuit from time $t_0$ to time $t_1$ in FIG. 6. At time $t_0$, switches $Q_1$ and $Q_4$ are turned off by the control circuit. The energy stored in $L_{AUX}$ will now be released and a current will continue to flow in the same direction (shown by the dashed arrows in FIG. 7B) but since $Q_2$ and $Q_4$ are off, the current will flow through the body diodes of switches $Q_3$ and $Q_4$ to complete the path. With the current flowing through the body diode of $Q_3$, the parasitic capacitance $C_{DS}$ of $Q_3$ will be discharged and, as shown in FIG. 6, the drain-to-source voltage at $Q_3$ ($V_{DS}(Q_3)$) will decrease towards zero. Switch $Q_3$ will then be turned ON at time $t_1$. Because $V_{DS}(Q_3)$ is zero or nearly zero when $Q_3$ is turned on, soft switching of $Q_3$ is effectively accomplished.

Figure 7C:
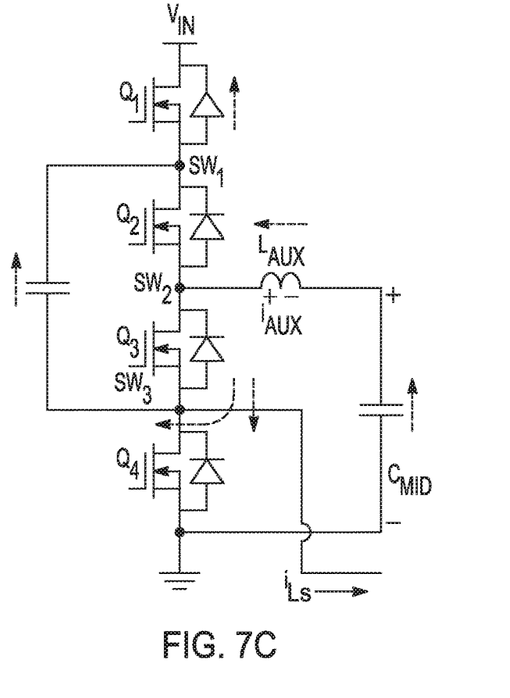

FIG. 7C shows the operation of the voltage converter circuit from time $t_1$ to time $t_2$ in FIG. 6. From $t_1$, the current in switch $Q_3$ increases. The circuit node labeled $SW_3$ is still a diode voltage below ground until the current in $Q_3$ is higher than the current $I_{LS}$ flowing to inductor $L_S$. Once the $Q_3$ current exceeds $I_{LS}$, the additional current will charge up the output capacitance of switch $Q_4$, while discharging the parasitic capacitance $C_{DS}$ of $Q_1$ at the same time. During this time, energy is again being stored in inductor $L_{AUX}$. At $t_2$, the circuit node labeled $SW_2$ is charged up to about $V_{IN}/2$, while $V_{DS}(Q_0)$ is zero volts. At time $t_2$, $Q_1$ is then turned ON. Because $V_{DS}(Q_1)$ is zero volts when $Q_1$ is turned on, soft switching of $Q_1$ is effectively accomplished.

Figure 7D:
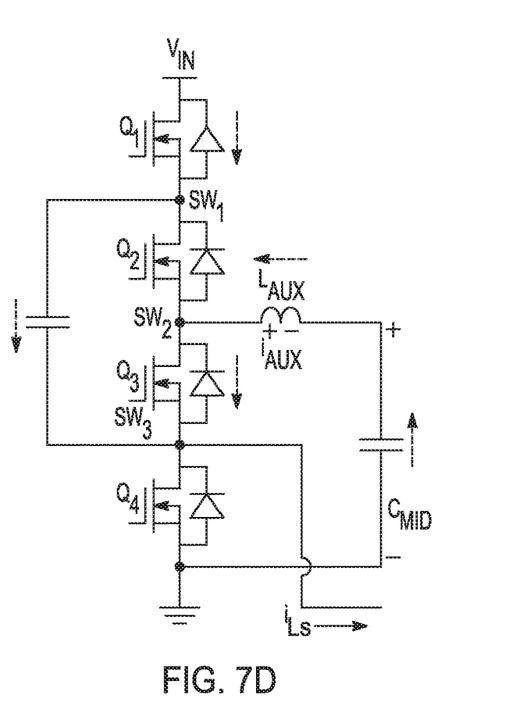

FIG. 7D shows the operation of the voltage converter circuit from time $t_2$ to time $t_3$ in FIG. 6. As shown in FIG. 7D, switches $Q_1$ and $Q_3$ are ON and switches $Q_2$ and $Q_4$ are off from time $t_2$ to time $t_3$. The current in $L_{AUX}$ ($I_{LAUX}$) flows from $C_{MID}$ to circuit node $SW_2$. The parasitic capacitance $C_{DS}$ of $Q_2$ will have a voltage at circuit node $SW_1$ greater than circuit node $SW_2$.

Figure 7E:
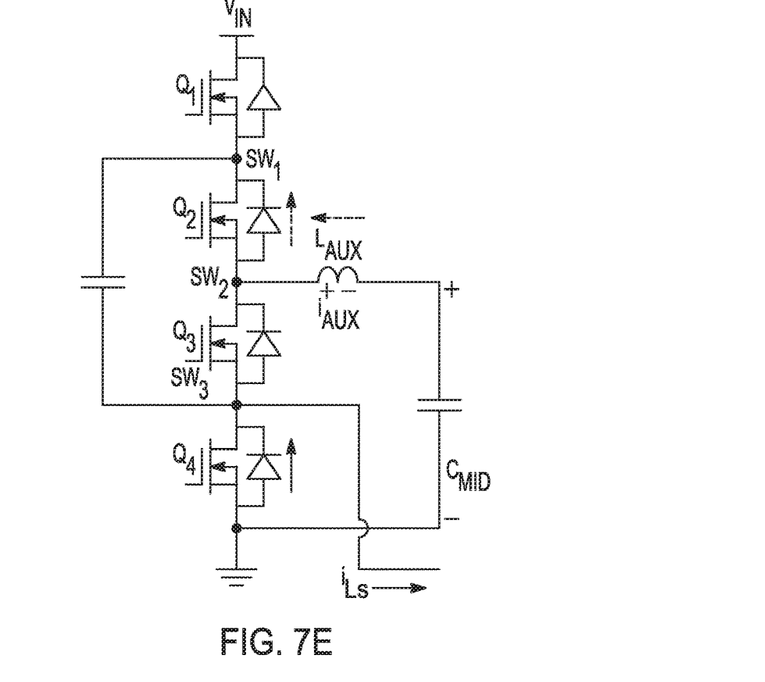

FIG. 7E shows the operation of the voltage converter circuit from time $t_3$ to time $t_4$ in FIG. 6. At time $t_3$, $Q_1$ and $Q_3$ are turned OFF. The energy stored in $L_{AUX}$ is now released and current $I_{LAUX}$ flows through the body diode of $Q_2$ and discharge the $C_{DS}$ of $Q_2$. Concurrently, the inductor current $I_{LS}$ freewheels through the body diode of switch $Q_4$. As shown in FIG. 7E, $V_{DS}(Q_2)$ is zero volts when switch $Q_2$ is turned on at time $t_4$. $V_{DS}(Q_4)$ is also zero volts when switch $Q_4$ is turned on at time $t_4$. Therefore, soft switching of $Q_1$ and $Q_4$ is effectively accomplished. Time $t_5$ in FIG. 6 is the beginning of the next switching cycle. Therefore, all of the switches of the circuit of FIG. 4 are operated with ZVS and the efficiency is improved through reduction in switching loss.

Figure 8:
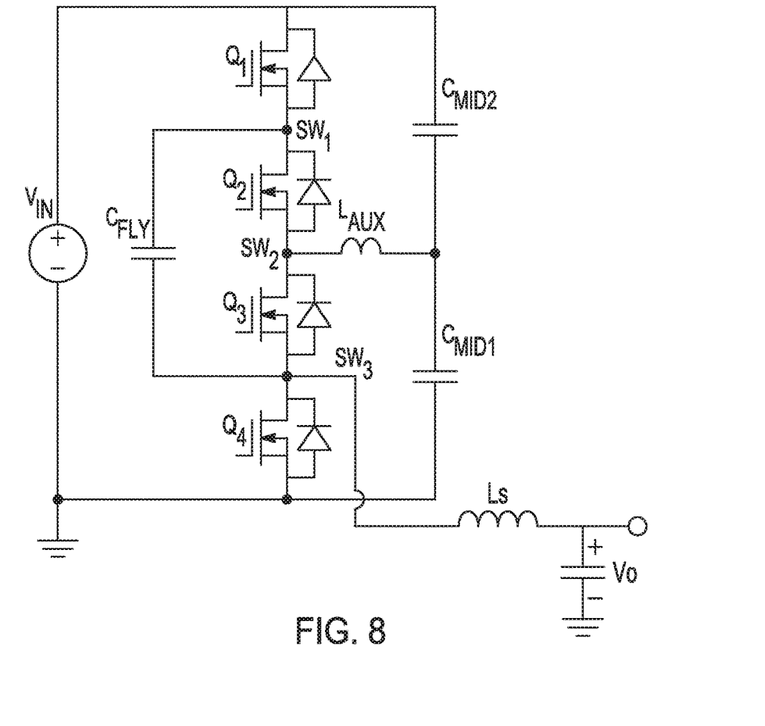
FIGS. 8-12 show additional examples of a hybrid switched capacitor voltage converter circuit according to some aspects.
Figure 9:
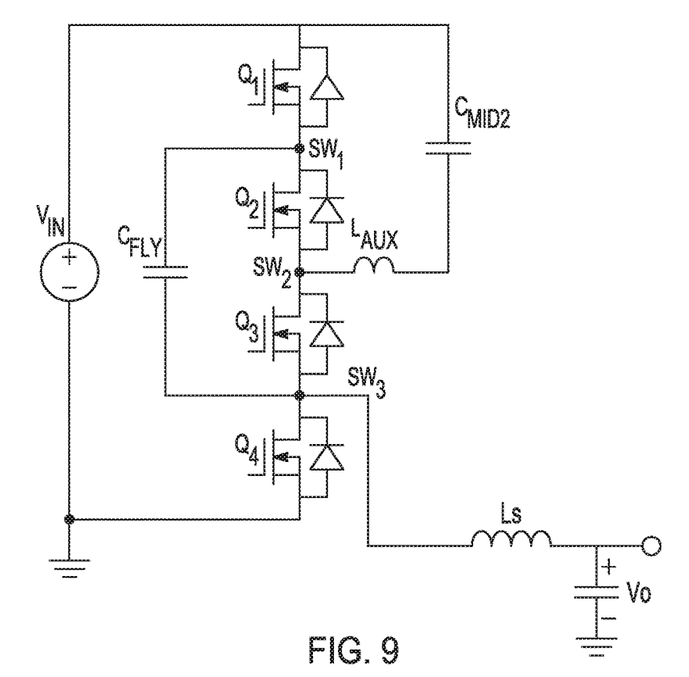

The concepts described previously herein can be extended to other circuit implementations. In FIG. 4, the auxiliary inductor $L_{AUX}$ is coupled to the mid-point capacitor $C_{MID}$ and to the circuit node labeled $SW_2$ which is the series connection between switches $Q_2$ and $Q_3$. FIGS. 8 and 9 show additional examples of a hybrid switched capacitor voltage converter circuit. In FIG. 8, $L_{AUX}$ is coupled to circuit node $SW_2$ and to the mid-point connection of midpoint capacitors $C_{MID1}$ and $C_{MID2}$. Capacitor $C_{MID2}$ will be in parallel with capacitors $C_{FLY}$ and $C_{MID1}$ when switches $Q_1$ and $Q_3$ are active in FIG. 8. In FIG. 9, $L_{AUX}$ is coupled to circuit node $SW_2$ and to midpoint capacitor $C_{MID2}$. Capacitors $C_{FLY}$ and $C_{MID2}$ are in parallel when switches $Q_1$ and $Q_3$ are active in FIG. 9.

Figure 10:
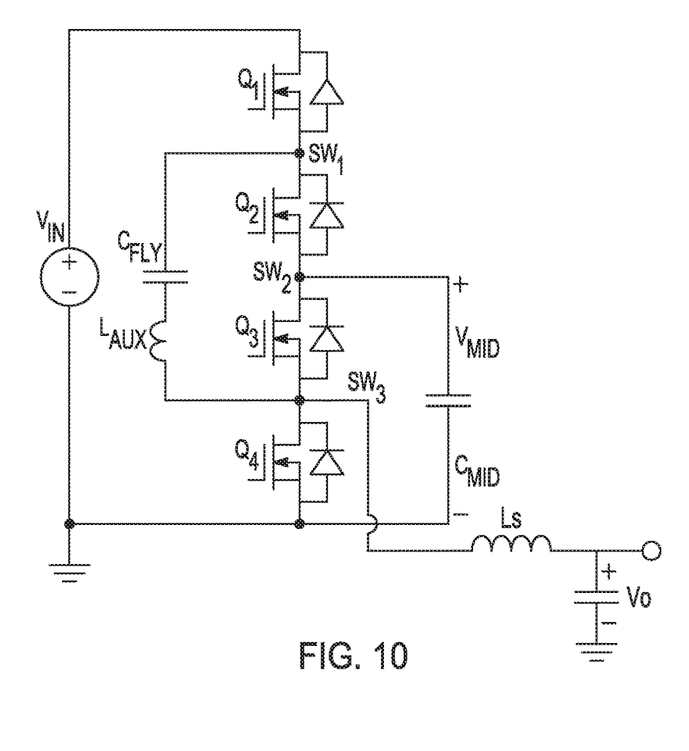

FIG. 10 is another example of a hybrid switched capacitor voltage converter circuit. In the example, auxiliary inductor $L_{AUX}$ is coupled to the flying capacitor $C_{FLY}$ of the charge pump circuit. The auxiliary inductor is also coupled to circuit node $SW_3$ which is the series connection between switches $Q_3$ and $Q_4$. When switches $Q_2$ and $Q_4$ are on, the flying capacitor $C_{FLY}$ charges the midpoint capacitor $C_{MID}$ through $Q_2$. When switch $Q_2$ is turned off, the current of the auxiliary inductor $I_{LAUX}$ that was flowing towards circuit node $SW_1$ from $C_{FLY}$ is commuted from switch $Q_2$ to the body diode of switch $Q_1$. Switch Q1 could be turned on when $V_{DS}(Q1)$ drops to zero volts for ZVS of $Q_1$. After $Q_1$ is turned on, the current $I_{LAUX}$ flowing towards circuit node $SW_3$ would increase and then charge up the output capacitance of $Q_4$ to $V_{MID}$. Switch $Q_3$ is turned on when $V_{DS}(Q_3)$ drops to zero volts for ZVS of $Q_3$.

Figure 11:
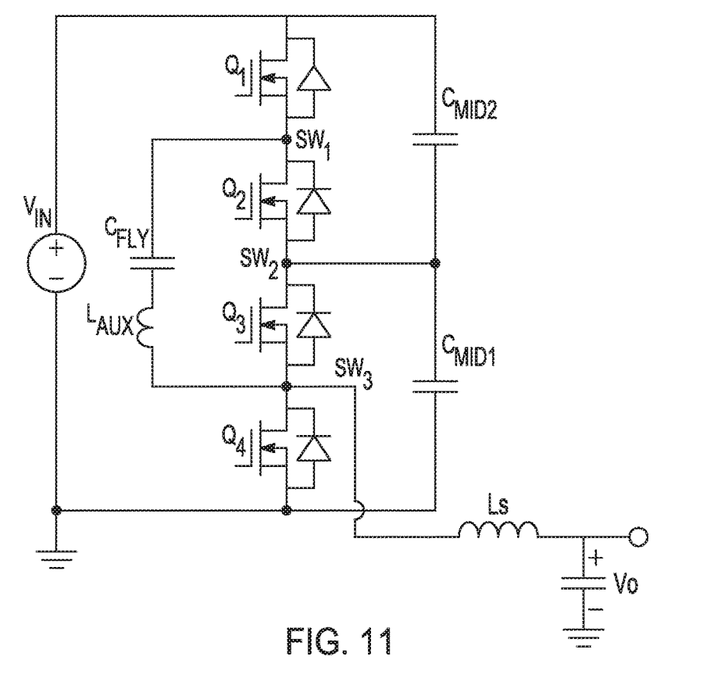
Figure 12:
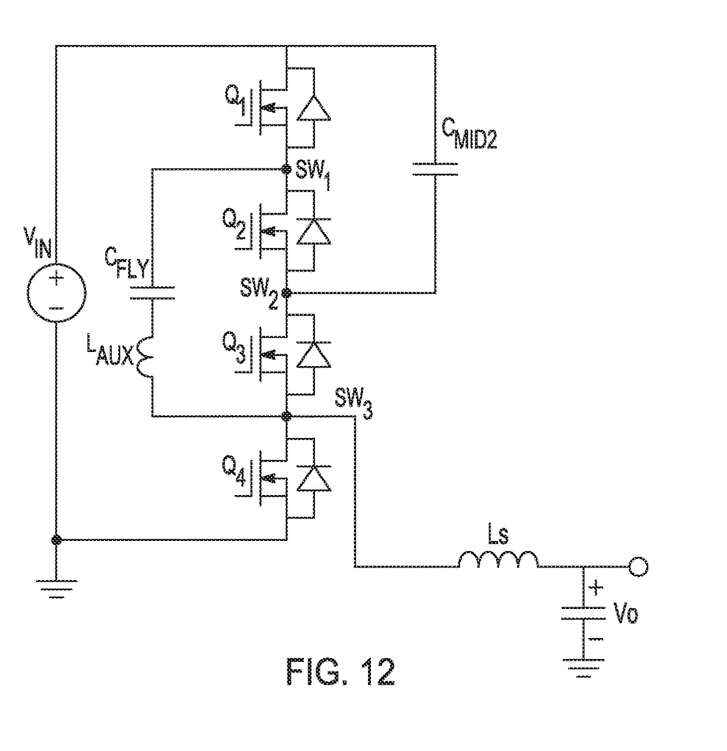

FIG. 11 is similar to FIG. 10 except that circuit node $SW_2$ is coupled to the mid-point connection of midpoint capacitors $C_{MID1}$ and $C_{MID2}$. FIG. 12 is similar to FIG. 10 except that the midpoint capacitor $C_{MID2}$ is coupled to $V_{IN}$ instead of circuit ground. The circuits and methods described herein provide a control scheme for ZVS of all switches of a hybrid switched capacitor voltage converter circuit. The ZVS control scheme minimizes switching loss and allows for smaller magnetic components and faster response time.

Additional Description and Aspects

Aspect 1 can include subject matter, such as a voltage converter, comprising a charge pump circuit, a switching converter circuit and a control circuit. The charge pump circuit includes multiple switch circuits connected in series. The switching converter circuit includes a first inductor coupled to an output node of the voltage converter circuit, and a second inductor coupled to a series connection of the multiple switch circuits. The control circuit configured to control activation of the multiple switch circuits to generate a regulated voltage at the output node, and to activate each of the multiple switch circuits when a drain to source voltage of the switch circuit is zero volts.

In Aspect 2, the subject matter of Aspect 1 can optionally include a charge pump circuit that includes a divide-by-two circuit topology and the second inductor coupled to a mid-point capacitor of the charge pump circuit.

In Aspect 3, the subject matter of Aspect 2 optionally includes four switch circuits connected in series between an input voltage node and a circuit ground node, and the second inductor connected to the mid-point capacitor and a series connection between a second switch circuit and a third switch circuit of the four switch circuits connected in series.

In Aspect 4, the subject matter of Aspect 1 optionally includes the second inductor coupled to a flying capacitor of the charge pump circuit.

In Aspect 5, the subject matter of Aspect 4 optionally includes four switch circuits connected in series including a first switch circuit coupled to an input voltage node and a fourth switch circuit coupled to a circuit ground node, and the second inductor is connected to a series connection between a third switch circuit and a fourth switch circuit of the four switch circuits connected in series.

In Aspect 6, the subject matter of one or any combination of Aspects 1-5 optionally includes four switch circuits connected in series including a first switch circuit connected to an input voltage node and a fourth switch circuit connected to a circuit ground node, and wherein the control circuit is configured to control the first switch circuit and a third switch circuit to be active as a pair and control a second switch circuit and a fourth switch circuit to be active as a pair, wherein an on-time of the first and third switch circuits is non-overlapping with an on-time of the second and fourth switch circuits.

In Aspect 7, the subject matter of Aspect 6 optionally includes the third switch circuit being turned on after the second and fourth switch circuits are turned off and a drain to source voltage of the third switch circuit is zero volts, and the first switch circuit is turned on after the third switch circuit is turned on.

In Aspect 8, the subject matter of Aspect 6 optionally includes the fourth switch circuit is turned on after the first switch circuit and third switch circuit are turned off and a drain to source voltage of the fourth switch circuit is zero volts, and the second switch circuit is turned on after the fourth switch circuit is turned on.

Aspect 9 can include subject matter (such as a method comprising acts, or a computer readable storage medium including instructions that, when performed by circuitry (e.g., a processor) of a power management unit, cause the power management unit to perform the acts), or can optionally be combined with one or any combination of Aspects 1-8 to include such subject matter, comprising charging a first inductor of a switching converter circuit of the voltage converter circuit and a second inductor of the voltage converter circuit using energy provided by a charge pump circuit of the voltage converter circuit, the charge pump circuit including multiple switch circuits connected in series; and activating the multiple switch circuits in a specified sequence to generate a regulated voltage at an output node of the voltage converter circuit, wherein each of the multiple switch circuits is activated when a drain to source voltage of the switch circuit is zero volts.

In Aspect 10, the subject matter of Aspect 9 optionally includes the multiple switch circuits including four switch circuits connected in series including a first switch circuit connected to an input voltage node and a fourth switch circuit connected to a circuit ground node, and wherein activating multiple switch circuits in a specified sequence to generate a regulated voltage at an output node includes having the first switch circuit and a third switch circuit active together and having a second switch circuit and a fourth switch circuit active together to generate the regulated voltage at the output node, wherein an on-time of the first and third switch circuits is non-overlapping with an on-time of the second and fourth switch circuits.

In Aspect 11, the subject matter of Aspect 10 optionally includes activating the third switch circuit after the second and fourth switch circuits are turned off and a drain to source voltage of the third switch circuit is zero volts; and activating the first switch circuit after the third switch circuit is activated.

In Aspect 12, the subject matter of Aspect 11 optionally includes discharging the second inductor after the second and fourth switch circuits are turned off to reduce the drain to source voltage of the third switch circuit to zero volts before the third switch is turned on.

In Aspect 13, the subject matter of Aspect 11 optionally includes activating the third switch to reduce the drain to source voltage of the first switch circuit to zero volts before turning on the first switch.

In Aspect 14, the subject matter of Aspect 10 optionally includes activating the fourth switch circuit after the first switch circuit and third switch circuit are turned off and a drain to source voltage of the fourth switch circuit is zero volts; and activating the second switch circuit after the fourth switch circuit is activated.

In Aspect 15, the subject matter of Aspect 14 optionally includes discharging the first inductor after the first and third switch circuits are turned off to reduce the drain to source voltage of the fourth switch circuit to zero volts before the fourth switch is turned on.

In Aspect 16, the subject matter of one or both of Aspects 14 and 15 optionally includes discharging the second inductor after the first and third switch circuits are turned off to reduce the drain to source voltage of the second switch circuit to zero volts before the second switch is turned on.

In Aspect 17, the subject matter of one or any combination of Aspects 9-16 optionally includes charging the first inductor and the second inductor using a charge pump circuit that reduces an input voltage by a factor of two.

Aspect 18 can include subject matter (such as a supply circuit) or can optionally be combined one or any combination of Aspects 1-17 to include such subject matter comprising a charge pump circuit including multiple switch circuits connected in series, a step-down switching converter circuit including a first inductor coupled to an output node of the supply circuit; and a second inductor coupled to a series connection of the multiple switch circuits; and a control circuit configured to control activation of the multiple switch circuits according to a duty cycle to generate a regulated voltage at the output node, and to activate each of the multiple switch circuits when a drain to source voltage of the switch circuit is zero volts.

In Aspect 19, the subject matter of Aspect 18 optionally includes a charge pump circuit that is a divide-by-two charge pump circuit and includes a mid-point capacitor; the multiple switch circuits include four switch circuits connected in series between an input voltage node and a circuit ground node, and the second inductor is coupled to the mid-point capacitor of the charge pump circuit and a series connection between a second switch circuit and a third switch circuit of the four switch circuits connected in series.

In Aspect 20, the subject matter of Aspect 19 optionally includes a charge pump circuit that includes a flying capacitor; the multiple switch circuits include four switch circuits connected in series including a first switch circuit coupled to an input voltage node and a fourth switch circuit coupled to a circuit ground node; and the second inductor is connected to the flying capacitor and to a series connection between a third switch circuit and a fourth switch circuit of the four switch circuits connected in series.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples" or "aspects." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A voltage converter circuit comprising:
   a charge pump circuit including at least four switch circuits connected in series, a flying capacitor coupled to a series connection between a first switch and a second switch of the at least four switch circuits, and a mid-point capacitor coupled directly to circuit ground;
   a switching converter circuit including a first inductor coupled to an output node of the voltage converter circuit and coupled to a junction between a third switch circuit and a fourth switch circuit of the at least four switch circuits;
   a second inductor including a first terminal coupled to a series connection of the at least four switch circuits, and a second terminal coupled in series to the mid-point capacitor;
   a control circuit configured to turn on the third switch circuit after turning off the second and fourth switch circuits and a drain to source voltage of the third switch circuit is zero volts, and turn on the first switch circuit after the third switch circuit is turned on; and
   turn on the fourth switch circuit after turning off the first and third switch circuits and a drain to source voltage of the fourth switch circuit is zero volts, and turn on the second switch circuit after the fourth switch circuit is turned on.

2. The voltage converter circuit of claim 1, wherein the charge pump circuit includes a divide-by-two circuit topology and the second inductor is coupled to the mid-point capacitor of the charge pump circuit.

3. The voltage converter circuit of claim 2, wherein the second inductor is connected to the mid-point capacitor and a series connection between the second switch circuit and the third switch circuit of the at least four switch circuits connected in series.

4. The voltage converter circuit of claim 1, wherein the at least four switch circuits include the first switch circuit coupled to an input voltage node and the fourth switch circuit coupled to a circuit ground node, and the second inductor is connected to a series connection between the third switch circuit and the fourth switch circuit of the at least four switch circuits connected in series.

5. The voltage converter circuit of claim 1,
   wherein the at least four switch circuits include the first switch circuit connected to an input voltage node and the fourth switch circuit connected to a circuit ground node, and
   wherein the control circuit is configured to control the at least four switch circuits so that on times of the first and third switch circuits are non-overlapping with on-times of the second and fourth switch circuits.

6. A method of operating a voltage converter circuit, the method comprising:
   charging a first inductor of a switching converter circuit of the voltage converter circuit and a second inductor of the voltage converter circuit using energy provided by a charge pump circuit of the voltage converter circuit, the charge pump circuit including at least four switch circuits connected in series, a flying capacitor coupled to a series connection between a first switch and a second switch of the at least four switch circuits, and a mid-point capacitor coupled directly to circuit ground, wherein the first inductor is coupled to a junction between a third switch circuit and a fourth switch circuit of the at least four switch circuits, and wherein the second inductor includes a first terminal coupled to a series connection of the at least four switch circuits, and a second terminal coupled in series to the mid-point capacitor;
   activating the at least four switch circuits in a specified sequence to generate a regulated, voltage at an output node of the voltage converter circuit, the specified sequence including turning on the third switch circuit after turning off the second and fourth switch circuits and a drain to source voltage of the third switch circuit is zero volts, and turn on the first switch circuit after the third switch circuit is turned on; and
   turning on the fourth switch circuit after turning off the first and third switch circuits and a drain to source voltage of the fourth switch circuit is zero volts, and turn on the second switch circuit after the fourth switch circuit is turned on.

7. The method of claim 6,
   wherein the at least four switch circuits include the first switch circuit connected to an input voltage node and the fourth switch circuit connected to a circuit ground node, and
   wherein activating at least four switch circuits in the specified sequence includes the on-times of the first and third switch circuits non-overlapping the on-times of the second and fourth switch circuits.

8. The method of claim 7, wherein activating at least four switch circuits in a specified sequence includes activating the third switch to reduce the drain to source voltage of the first switch circuit to zero volts before turning on the first switch.

9. The method of claim 7, wherein activating at least four switch circuits in a specified sequence includes activating the fourth switch circuit after the first switch circuit and third switch circuit are turned off and a drain to source voltage of the fourth switch circuit is zero volts; and activating the second switch circuit after the fourth switch circuit is activated.

10. The method of claim 9, wherein activating the fourth switch circuit after the first and third switch circuits are turned off and a drain to source voltage of the fourth switch circuit is zero volts includes discharging the first inductor after the first and third switch circuits are turned off to reduce the drain to source voltage of the fourth switch circuit to zero volts before the fourth switch is turned on.

11. The method of claim 9, wherein activating the second switch circuit includes discharging the second inductor after the first and third switch circuits are turned off to reduce the drain to source voltage of the second switch circuit to zero volts before the second switch is turned on.

12. The method of claim 6, wherein charging the first inductor and the second inductor includes charging the first inductor and the second inductor using a charge pump circuit that reduces an input voltage by a factor of two.

13. A supply circuit comprising:
   a charge pump circuit including at least four switch circuits connected in series, a midpoint capacitor coupled directly to circuit ground, and a flying capacitor coupled to a series connection between a first switch circuit and a second switch circuit of the at least four switch circuits;
   a step-down switching converter circuit including a first inductor coupled to an output node of the supply circuit and coupled to a junction between a third switch circuit and a fourth switch circuit of the at least four switch circuits;

a second inductor including a first terminal coupled directly in series with the flying capacitor and a second terminal coupled to a second series connection of the at least four switch circuits;

a control circuit configured to turn on the third switch circuit after turning off the second and fourth switch circuits and a drain to source voltage of the third switch circuit is zero volts, and turn on the first switch circuit after the third switch circuit is turned on; and turn on the fourth switch circuit after turning off the first and third switch circuits and a drain to source voltage of the fourth switch circuit is zero volts, and turn on the second switch circuit after the fourth switch circuit is turned on.

14. The supply circuit of claim 13, wherein:

the charge pump circuit is a divide-by-two charge pump circuit;

the at least four switch circuits are connected in series between an input voltage node and a circuit ground node; and the second inductor is coupled to the mid-point capacitor of the charge pump circuit and a series connection between a second switch circuit and the third switch circuit of the at least four switch circuits connected in series.

15. The supply circuit of claim 13, wherein:

the at least four switch circuits include a first switch circuit coupled to an input voltage node and the fourth switch circuit coupled to a circuit ground node; and the second inductor is connected to a series connection between the third switch circuit and the fourth switch circuit of the at least four switch circuits connected in series.

* * * * *